(12) United States Patent
Mukoujima et al.

(10) Patent No.: US 7,014,263 B2
(45) Date of Patent: Mar. 21, 2006

(54) VEHICLE SEATS

(75) Inventors: Takashi Mukoujima, Toyota (JP);
Kenji Fujinaga, Toyota (JP); Shigeru Fukuda, Nagoya (JP); Yasunori Hasegawa, Kasugai (JP); Jun Kanamori, Yokosuka (JP); Hideki Shimizu, Toyota (JP); Hiromu Mizuno, Toyota (JP)

(73) Assignee: Araco Kabushiki Kaisha, Aichi-Ken (JP)

( * ) Notice: Subject to any disclaimer, the term of this patent is extended or adjusted under 35 U.S.C. 154(b) by 0 days.

(21) Appl. No.: 10/721,778

(22) Filed: Nov. 25, 2003

(65) Prior Publication Data

US 2004/0160104 A1 Aug. 19, 2004

(30) Foreign Application Priority Data

Nov. 28, 2002 (JP) ............................... 2002-346404

(51) Int. Cl.
*B60N 2/30* (2006.01)

(52) U.S. Cl. .................. 297/341; 297/321; 297/334; 297/378.1

(58) Field of Classification Search ............. 297/321, 297/324, 334, 341, 378.1, 378.12
See application file for complete search history.

(56) References Cited

U.S. PATENT DOCUMENTS

| 1,427,280 A | * | 8/1922 | Gahm .......................... 297/64 |
| 2,926,949 A | * | 3/1960 | Himka et al. .................. 296/66 |
| 4,805,953 A | * | 2/1989 | Yamauchi ................. 296/65.09 |
| 5,466,047 A | * | 11/1995 | Bauer et al. ................. 297/367 |
| 5,482,349 A | * | 1/1996 | Richter et al. ................. 297/15 |
| 5,570,931 A | | 11/1996 | Kargiis et al. |
| 5,941,602 A | | 8/1999 | Sturt et al. |
| 6,152,533 A | * | 11/2000 | Smuk .......................... 297/341 |

FOREIGN PATENT DOCUMENTS

JP 2002-154359 5/2002

* cited by examiner

*Primary Examiner*—Rodney B. White
*Assistant Examiner*—Joe Edell
(74) *Attorney, Agent, or Firm*—Patterson, Thuente, Skaar & Christensen, P.A.

(57) ABSTRACT

A vehicle seat may include a seat cushion movably supported on a vehicle floor bracket, a seat back rotatably supported forwardly and rearwardly on the vehicle floor bracket via a seat reclining mechanism, a connecting mechanism interconnecting the seat cushion and seat back, and a supporting mechanism supporting the seat cushion on a vehicle floor. The connecting mechanism is fixedly connected to the seat cushion and is rotatably connected to the seat back. The connecting mechanism is arranged and constructed such that when the seat back is rotated forwardly, the seat cushion can be moved forwardly and downwardly and that when the seat back is rotated rearwardly from its normal position, the seat cushion can be maintained in place and not be moved.

5 Claims, 6 Drawing Sheets

VEHICLE SEATS

This application claims priority to Japanese Patent Application Serial Number 2002-346404, the contents of which are incorporated herein by reference.

BACKGROUND OF THE INVENTION

1. Field of the Invention

The present invention relates to a vehicle seat. More particularly, the present invention relates to a retractable vehicle seat in which a seat cushion is arranged and constructed to be moved forwardly and downwardly when a seat back is folded onto the seat cushion.

2. Description of the Related Art

Such a retractable vehicle seat is taught, for example, by Japanese Laid-Open Patent Publication Number 2002-154359.

In this known art, the vehicle seat includes a seat cushion and a seat back. A front link is attached to a forward end of the seat cushion. The front link is pivotally connected to a bracket that is mounted on a vehicle floor. At the other end, a rear link is attached to a rear end of the seat cushion. The rear link is also pivotally connected to the seat back. When the seat back is folded forwardly toward the seat cushion, the front link is pivoted via the rear link, thereby moving the seat cushion forwardly and downwardly. The end result of the seat back being folded onto the seat cushion is the retraction of the vehicle seat from the passenger compartment.

However, when the seat back is tilted rearwardly (i.e., reclined), the front link is reversely pivoted via the rear link, thereby moving the seat cushion rearwardly and upwardly. Subsequently, the position of the seat cushion continues to change as the seat back is reclined. As a result, reclining the seat back can undesirably affect the seating position of an occupant.

SUMMARY OF THE INVENTION

It is, accordingly, one object of the present teachings to provide an improved, retractable vehicle seat.

In one aspect of the present teachings for example, a vehicle seat may include a seat cushion, a seat back forwardly and rearwardly rotatably supported on a vehicle floor bracket via a seat reclining mechanism, a supporting mechanism movably supporting the seat cushion on the vehicle floor bracket, and a connecting mechanism interconnecting the seat cushion and seat back. The connecting mechanism can be fixedly connected to the seat cushion and is rotatably connected to the seat back. The connecting mechanism is arranged and constructed such that when the seat back is rotated forwardly, the seat cushion can be repositioned forwardly and downwardly. The connecting mechanism is arranged and constructed such that when the seat back is rotated rearwardly from its normal position, the seat cushion can essentially remain stationary and maintained in position.

According to the present teachings, when the seat back is further rotated rearwardly (i.e., reclined) from its normal position, the seat cushion may be effectively prevented from moving rearwardly and upwardly. Therefore, the seat cushion can be reliably maintained in place. As a result, reclining the seat back does not undesirably affect the seating position of an occupant due to the unintended movements of the seat cushion.

Other objects, features, and advantages, of the present invention will be readily understood after reading the following detailed description together with the accompanying drawings and claims.

DETAILED DESCRIPTION OF THE INVENTION

A representative example of the present invention has been described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the foregoing detailed description may not be necessary to practice the invention in the broadest sense, and are instead taught merely to particularly describe detailed representative examples of the invention. Moreover, the various features taught in this specification may be combined in ways that are not specifically enumerated in order to obtain additional useful embodiments of the present teachings.

A detailed representative embodiment of the present teachings is shown in FIG. 1 to FIG. 6.

As shown in FIG. 1(A), a retractable vehicle seat 1 includes a seat cushion 12 and a seat back 14. The vehicle seat 1 may preferably be supported on a vehicle floor (not shown) via a pair of L-shaped support arms 10 (i.e., vehicle floor brackets) that are positioned on both sides of the seat 1. Typically, the support arms 10 are slidably attached to a slide rail assembly (not shown) that is affixed to the vehicle floor. Each of the support arms 10 includes a horizontally extending portion having a forward arm end 10a and a vertically projected portion having an upward arm end 10b.

As shown in FIG. 1(A), the seat cushion 12 includes a forward seat end 12a and a rearward seat end 12b. The forward seat end 12a is linked to the forward arm ends 10a of the support arms 10 via front linking mechanisms 20 (i.e., supporting mechanisms). At the opposite end, the rearward seat end 12b is slidably supported in the horizontal direction (both in the forward and rearward directions) by a support member (support block 40 in the example shown) that is positioned between the support arms 10. The rearward seat end 12b is also linked to a lower end of the seat back 14 via rear linking mechanisms 30 (i.e., connecting mechanisms). In addition, the lower end of the seat back 14 is rotatably connected to the upper arm ends 10b of the support arms 10 via a seat reclining mechanism (not shown). The seat reclining mechanism allows the seat back 14 can be rotated forward and rearward (counterclockwise and clockwise respectively as shown in FIG. 1(A)). This allows the seat back to be adjusted to a desired tilting position. A lock releasing lever 18 is provided near an upper end of the seat back 14 so that a locking mechanism (not shown) of the seat reclining mechanism can be released by operating the lock releasing lever 18.

As shown in FIG. 1(A), each of the front linking mechanisms includes a single linking member 21 which may preferably be pivotally connected to each of the forward arm ends 10a and the forward seat end 12a via pivot pins 20a and 20b, respectively. The front linking mechanism allows the seat cushion 12 to be moved forwardly and rearwardly while being vertically (upwardly and downwardly) shifted with respect to the vehicle floor.

Figure 5:
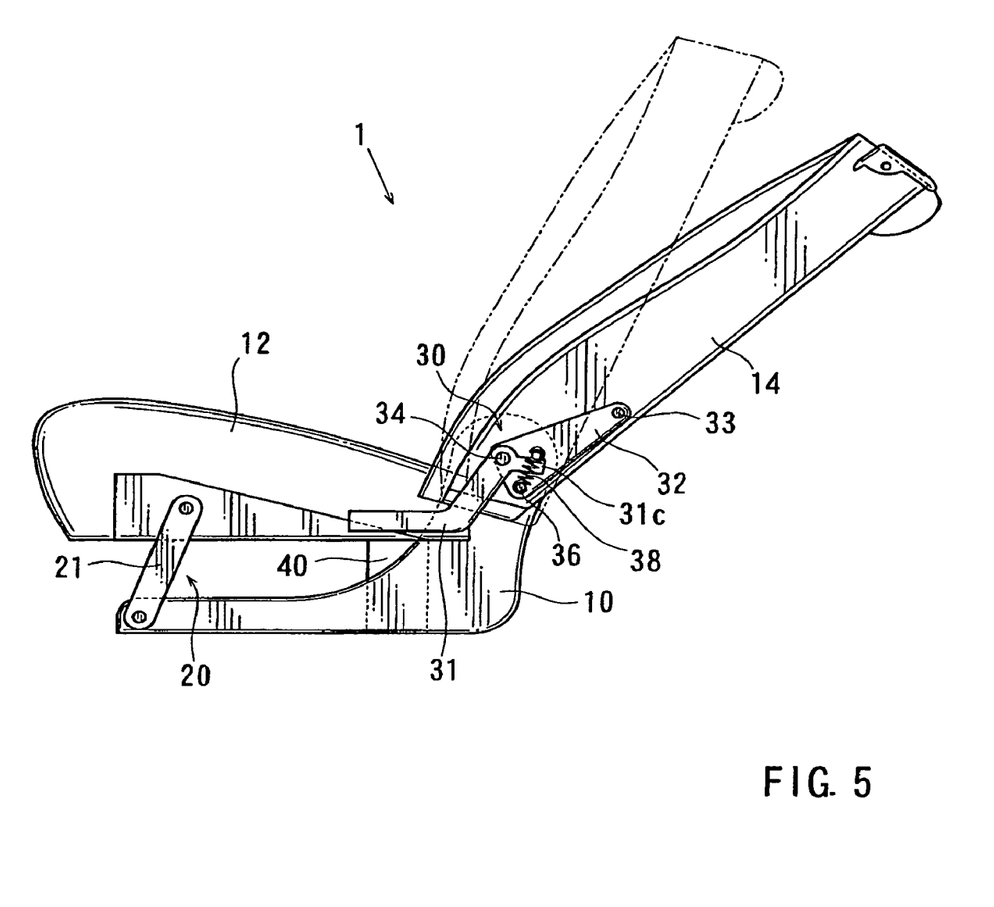
FIG. 5 is a side view of the retractable vehicle seat, which illustrates a reclined condition of the seat in a seat reclining process.
Figure 6:
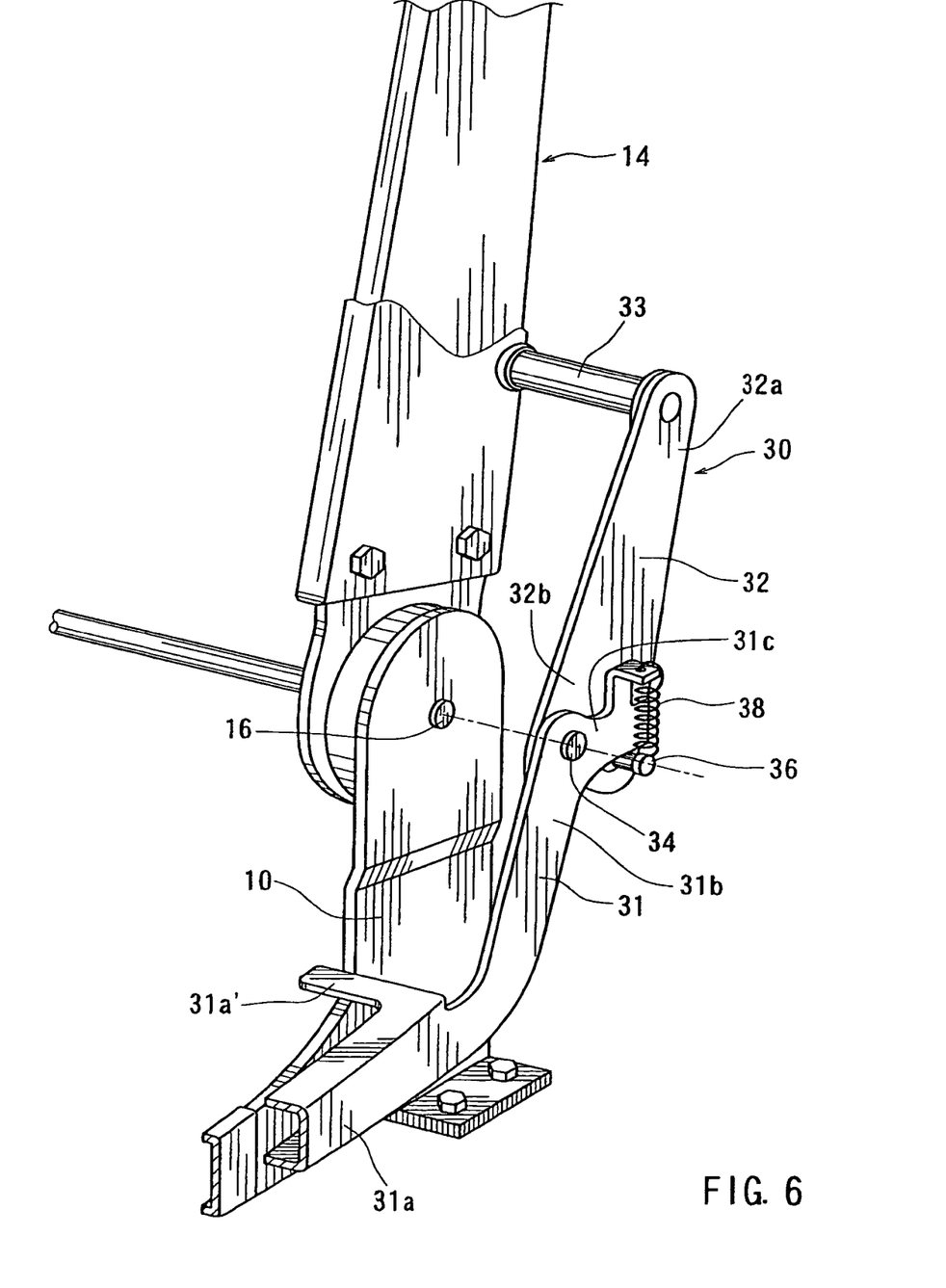
FIG. 6 is an enlarged perspective view of a connecting mechanism of the seat.

As shown in FIG. 1(A), FIG. 1(B), and FIG. 6, each of the rear linking mechanisms 30 comprises a substantially V-shaped lower linking member 31 (i.e., first linking member) and a substantially triangular shaped upper linking member 32 (i.e., second linking member). The lower linking member 31 has a horizontal lower portion 31a and an upper portion 31b. The upper linking member 32 has a narrow upper portion 32a and a broader lower portion 32b. The lower portion 31a of the lower linking member 31 is fixedly connected to the rearward seat end 12b of the seat cushion 12. The upper portion 32a of the upper linking member 32 is pivotally or rotatably connected to the seat back 14 via a pivot pin 33. Further, the upper portion 31b of the lower linking member 31 is pivotally or rotatably connected to the lower portion 32b of the upper linking member 32 via a pivot pin (i.e., connecting member) 34. Preferably, the upper linking member 32 and the lower linking member 31 may be arranged such that the pivot pin 34 aligns with a rotational axis 16 (e.g., FIG. 2 and FIG. 6) of the seat reclining mechanism when the seat back 14 is positioned in the range from at least a normal position, such as the position shown in FIG. 1(A), to the reclined position shown in FIG. 5. In addition, as shown in FIG. 6, the lower portion 31a of the lower linking member 31 has a detent projection (i.e., detent member) 31a'. The detent projection 31a' is appropriately positioned so as to engage the lower arm 10 when the seat back 14 is positioned in the normal position (FIG. 1(A)).

As best shown in FIG. 1(B) and FIG. 6, the lower linking member 31 includes an upper projection 31c that projects to the rear from upper portion 31b. Conversely, the lower portion 32b of upper linking member 32 is provided with a pin-shaped stopper 36. The stopper 36 is arranged and constructed to engage and support the underside of the upper projection 31c of the lower linking member 31 in such a way that the upper linking member 32 is preferably inhibited from rotating forwardly relative to the lower linking member 31. This means that the upper linking member 32 and the lower linking member 31 are restrictively rotatably interconnected with each other. In addition, a resilient connection (preferably a tension spring 38) is provided between the upper projection 31c and the stopper 36, so that the upper projection 31c may normally be biased to contact the stopper 36. The tension spring 38 preferably maintains the desired relative position between the lower linking member 31 and the upper linking member 32.

A representative process for retracting the vehicle seat 1 will now be described. First, as shown in FIG. 1(A), at a normal condition of the seat 1 (which corresponds to the normal position of the seat back 14), the lock releasing lever 18 is operated and moved from its lock position to its release position (from a position shown by a solid line to a position shown by a broken line). Thereby releasing the locking mechanism of the seat reclining mechanism. The seat reclining mechanism is subsequently operated, forwardly rotating the seat back 14. Preferably, the upper linking member 32 may be moved forwardly along with the seat back 14 due to the connection via the pivot pin 33 between the upper portion 32a and the seat back 14.

As will be recognized at this time, the stopper 36 of the upper linking member 32 may preferably be maintained in contact with the upper projection 31c of the lower linking member 31 due to the bias of the resilient member, preferably tension spring 38. This bias inhibits the upper linking member 32 from rotating forwardly relative to the lower linking member 31. Essentially, the upper linking member 32 and the lower linking member 31 may be considered to be closely coupled with each other during this time. As a result, when the seat back 14 is tilted forwardly, the lower linking member 31 and the upper linking member 32 are also moved forwardly, effectively as a unit.

Figure 1:
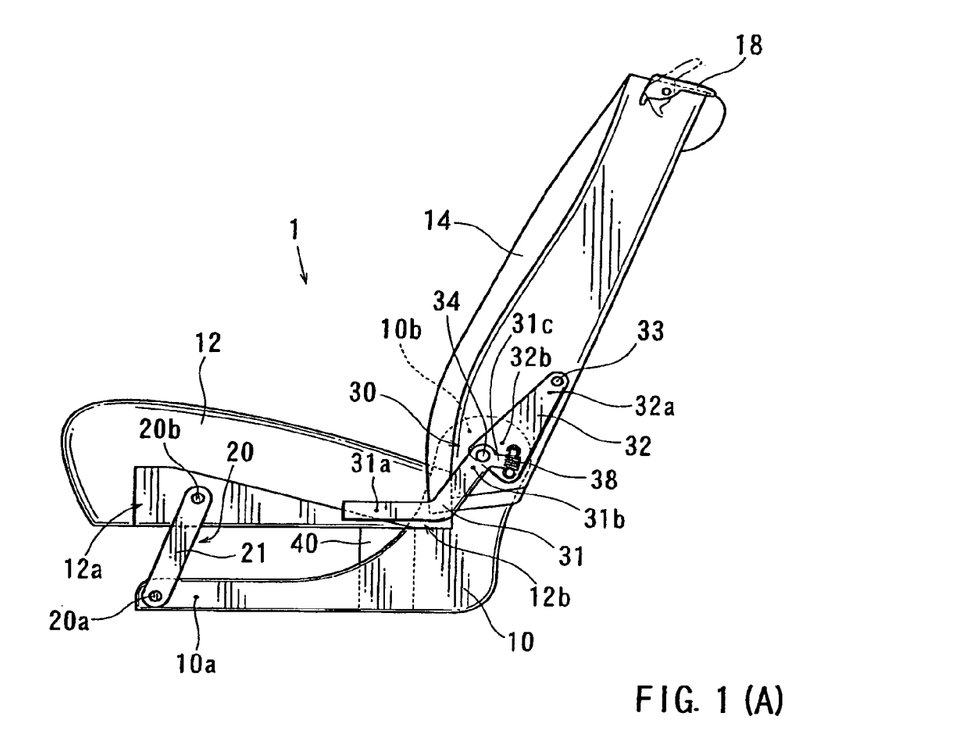
FIG. 1(A) is a side view of a retractable vehicle seat of the present teachings, illustrating a normal condition of the seat, i.e., a normal position of a seat back.
FIG. 1(B) is an enlarged view of a portion of FIG. 1(A)
Figure 2:
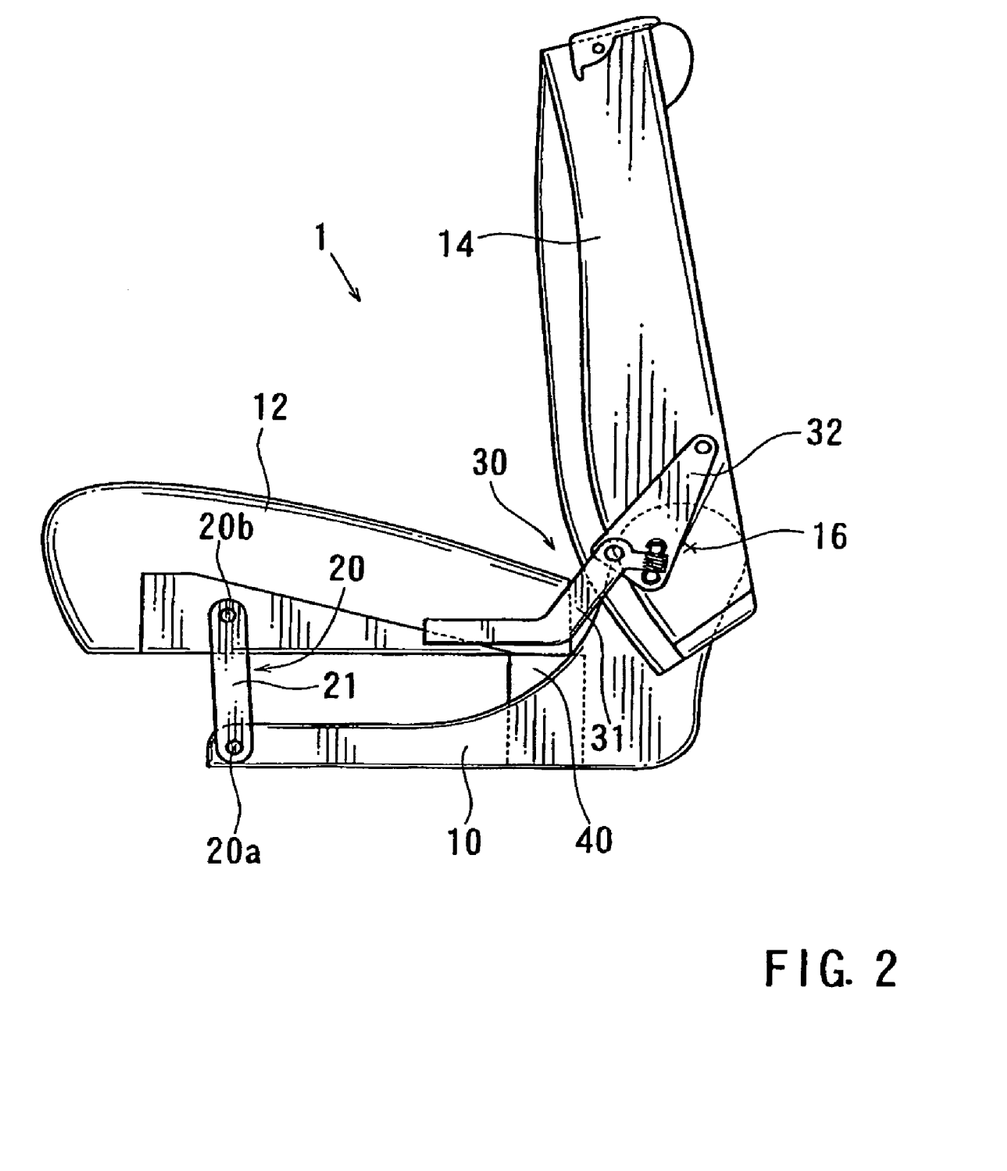
FIG. 2 is a side view of the retractable vehicle seat, illustrating an initial or first intermediate condition of the seat in a seat retracting process.
Figure 3:
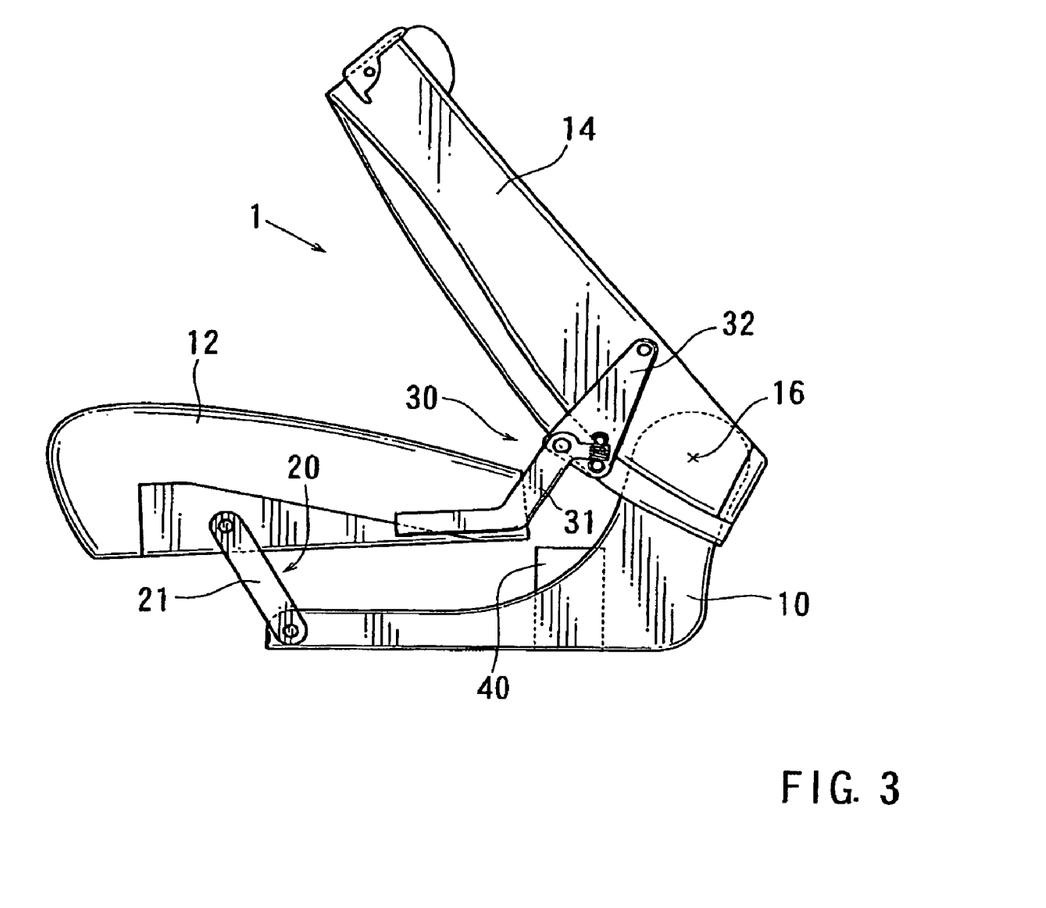
FIG. 3 is a side view of the retractable vehicle seat, illustrating a second intermediate condition of the seat in the seat retracting process.

When the upper linking member 32 and the lower linking member 31 are moved forwardly, the seat cushion 12 is also forced forward and moved, due to the connection between the lower portion 31a of the lower linking member 31 and the rearward seat end 12b of the seat cushion 12. When the seat cushion 12 is moved forwardly, the linking member 21 (the front linking mechanism 20) may preferably be rotated about the pivot pins 20a and 20b. During the initial or first intermediate condition of the retracting process, as shown in FIG. 2, preferably the seat cushion 12 may be upwardly shifted with respect to the vehicle floor as it moves forwardly. Subsequently, during a second intermediate condition of the retracting process, as shown in FIG. 3, preferably the rearward seat end 12b may disengage from the support block 40 and as a result, the seat cushion 12 may be shifted downwardly with respect to the vehicle floor as it further moves forwardly. The latter motion of the seat cushion 12 is generally referred to as a tilt down motion.

Figure 4:
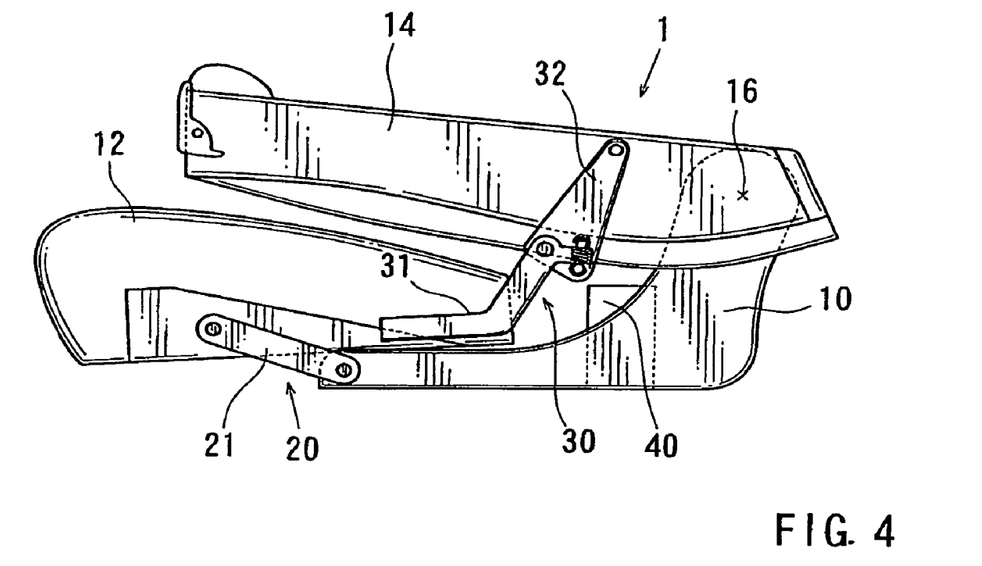
FIG. 4 is a side view of the retractable vehicle seat, illustrating a final or retracted condition of the seat in the seat retracting process, i.e., a completely retracted position of a seat back.

When the seat back 14 is tilted forwardly toward a final step of the retracting process, as shown in FIG. 4, the seat cushion 12 is moved to its farthest position forward and its lowermost position relative to the vehicle floor. At the same time, the seat back 14 is folded onto the seat cushion 12 in order that the vehicle seat 1 may be retracted from the passenger or cargo area of the vehicle. As shown in FIG. 4, when the seat back 14 is configured in a completely folded position (i.e., retracted position), the orientation of the back surface of the seat back 14 is substantially horizontal, so as to be coplanar with a floor of the vehicle luggage compartment (not shown).

A process for reconfiguring the vehicle seat 1 from a fully retracted condition (FIG. 4) to a normal condition (FIG. 1(A)) will now be described. First, the seat back 14 is raised or forced rearwardly. As a result, similar but opposite to the retracting process described above, the upper linking member 32 may preferably be moved rearwardly along with the seat back 14.

The stopper 36 of the upper linking member 32 may continue to maintain contact with the upper projection 31c of the lower linking member 31 by means of the biasing resulting from the spring force of the tension spring 38. Preferably, the upper linking member 32 and the lower linking member 31 may be inhibited by the tension spring 38 from rotating relative to each other. As a result, when the seat back 14 is moved rearwardly, the lower linking member 31 is also moved rearwardly along with the upper linking member 32, both upper and lower members moving essentially together.

When the upper linking member 32 and the lower linking member 31 are moved rearwardly, the seat cushion 12 is pulled in the same direction. When the seat cushion 12 is pulled rearwardly, the linking member 21 (of the front linking mechanism 20) preferably may be rotated clockwise about the pivot pins 20a and 20b. As a result, the seat cushion 12 may be pulled back from the retracted condition shown in FIG. 4 to the normal condition shown in FIG. 1(A) via the first and second intermediate conditions shown in FIG. 2 and FIG. 3 while being shifted upwardly and subsequently downwardly with respect to the vehicle floor.

Next is the description of a process for reclining the vehicle seat 1 from the normal condition shown in FIG. 1(A), to a reclined condition shown by a solid line in a FIG. 5. First, the seat reclining mechanism is operated, thereby allowing the seat back 14 to be subjected to a force rearwardly in the reclining direction. Substantially simultaneously, the upper linking member 32 and the lower linking member 31 are also subjected to the rearward force. However, the lower linking member 31 is effectively inhibited from moving rearwardly due to the engagement between the detent projection 31a′ and the lower arm 10. The result is that the lower linking member 31 is reliably restricted by the interaction between the detent projection 31a′ and the lower arm 10. Unlike the retracting process and the reversing of the retracting process to a normal condition described above, the upper linking member 32 may now be preferably rotated rearwardly with respect to the lower linking member 31. The upper linking member 32 is individually rotated around the pivot pin 34, aligned with the rotational axis 16 of the seat reclining mechanism, against the spring force of the tension spring 38. The upper linking member 32 and the lower linking member 31 can be rotated relative to each other around the pivot pin 34. As will be appreciated, this motion of the upper linking member 32 may involve disengagement between the stopper 36 of the upper linking member 32 from the upper projection 31c of the lower linking member 31.

When the seat back 14 is reclined, the lower linking member 31 may preferably remain effectively stationary. As a result, during the seat reclining process, the seat cushion 12 connected to the lower linking member 31 may be maintained substantially in place and not subjected to undesired movement. Overall, the reclining motion of the seat back 14 does riot affect the position of the seat cushion 12. Therefore, the seating position of an occupant may not be undesirably affected even as the seat back 14 is reclined over a wide range of reclining angles.

The upper linking member 32 can rotate smoothly during the reclining of the seat back because the pivot pin 34 is preferably arranged to align with the rotational axis 16 of the seat reclining mechanism. In addition, the lower linking member 31 is not significantly forced forward when the seat back 14 is reclined. Therefore, the seat cushion 12, connected to the lower linking member 31, can be effectively prevented from undesirably moving forward when the seat back 14 is reclined. Moreover, although the lower linking member 31 is forced downward when reclining the seat back 14, the seat cushion 12 connected thereto does not move downward because the rearward seat end 12b of the seat cushion 12 is effectively supported by the support block 40.

What is claimed is:

1. A vehicle seat, comprising:
   a seat cushion;
   a seat back forwardly and rearwardly rotatably supported on a vehicle floor bracket about a rotational axis;
   a supporting mechanism movably supporting the seat cushion on the vehicle floor bracket; and
   a connecting mechanism interconnecting the seat cushion and seat back, the connecting mechanism comprising a first linking member fixedly connected to the seat cushion and a second linking member rotatably connected to the seat back via a first pivot pin that is offset from the rotational axis of the seat back; and
   wherein the first and second linking members are restrictively rotatably interconnected via a second pivot pin such that when the seat back is rotated forwardly from a normal position, the first and second linking members are inhibited from rotation relative to each other, so that the seat cushion can be repositioned forwardly and downwardly and that when the seat back is rotated rearwardly from the normal position, the first and second linking members are rotated relative to each other so that the seat cushion can be maintained in a substantially stationary position; and the second pivot pin is arranged and constructed so as to be coaxially aligned with the rotational axis of the seat back when the seat back is recline rearwardly from the normal position so that the seat back is independently rotated without moving the seat cushion after the second pivot pin aliens with the rotational axis.

2. A vehicle scat as defined in claim 1, wherein the connecting mechanism comprises:
   a projection included on the first linking member; and
   a stopper included on the second linking member; and
   a tension spring resiliently connecting the projection and the stopper; and
   wherein the tension spring provides a biasing force for restricting the rotation of the first and second linking members relative to each other when the seat back is positioned in the range from the normal condition to a retracted position.

3. A vehicle seat as defined in claim 1 further comprising:
   a support member; and
   wherein the supporting mechanism comprises;
   a linking member that interconnects between the seat cushion and the vehicle floor bracket; and
   wherein the linking member being arranged and constructed such that the seat cushion is moved forwardly and rearwardly while being vertically shifted during the rotation of the seat back in the range from the normal position to a retracted position; and
   wherein the seat cushion is further supported via the support member.

4. A vehicle seat, comprising:
   a seat cushion; and
   a seat back that is rotatably supported on a vehicle floor bracket via a rotational axis, so that reclining angles relative to the bracket can be adjustably changed; and
   a front linking mechanism movably interconnecting the seat cushion and the bracket such that the seat cushion can be pivoted between a forward lower retracted position and a rearward upper use position; and
   a rear linking mechanism comprising a first linking member fixedly connected to the seat cushion and a second linking member rotatably connected to the seat back via a pivot pin that is offset from the rotational axis of the seat back, the first and second linking members being interconnected via a connecting member; and
   wherein the first and second linking members are arranged and constructed such that when the seat back is rotated forwardly, the seat cushion is moved toward the retracted position; and wherein the first and second linking members are arranged and constructed such that when the seat back is rotated rewardly, the seat cushion is moved toward the use position; and wherein the first and second linking members are arranged and constructed such that when the seat back is rotated forwardly, the first and second linking members are inhibited from rotation relative to each other; and wherein the first and second linking members are arranged and constructed such that when the seat back is rotated rearwardly and the connecting member coaxially aligns with the rotational axis, the first and second linking members are rotated relative to each other.

5. A vehicle seat as defined in claim 4 further comprising:

a detent member that is arranged and constructed such that when the seat back is rotated rearwardly and the connecting member aligns with the rotational axis, the seat cushion is inhibited from moving rearwardly.

* * * * *